United States Patent
Rao et al.

(10) Patent No.: US 7,810,041 B2
(45) Date of Patent: Oct. 5, 2010

(54) COMMAND INTERFACE

(75) Inventors: Pramod S. Rao, Richardson, TX (US); Gaurav Sandhir, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 303 days.

(21) Appl. No.: 11/398,330

(22) Filed: Apr. 4, 2006

(65) Prior Publication Data

US 2007/0234228 A1 Oct. 4, 2007

(51) Int. Cl.
G06F 3/048 (2006.01)
G06F 15/173 (2006.01)
G06F 15/16 (2006.01)

(52) U.S. Cl. ............... 715/771; 715/764; 709/223; 709/250

(58) Field of Classification Search ........... 715/771, 715/764; 709/223, 250
See application file for complete search history.

(56) References Cited

U.S. PATENT DOCUMENTS

| | | | |
|---|---|---|---|
| 5,961,594 A * | 10/1999 | Bouvier et al. ............. 709/223 |
| 5,999,978 A | 12/1999 | Angal et al. | |
| 6,038,563 A | 3/2000 | Bapat et al. | |
| 6,195,097 B1 * | 2/2001 | Shrader et al. ............. 715/804 |
| 6,236,996 B1 | 5/2001 | Bapat et al. | |
| 6,385,172 B1 | 5/2002 | Kataria et al. | |
| 6,519,635 B1 | 2/2003 | Champlin et al. | |
| 6,532,491 B1 | 3/2003 | Lakis et al. | |
| 6,724,408 B1 * | 4/2004 | Chen et al. ................. 715/853 |
| 7,010,780 B2 | 3/2006 | Perycz et al. | |
| 7,039,724 B1 * | 5/2006 | Lavian et al. .............. 709/250 |
| 7,076,540 B2 | 7/2006 | Kurose et al. | |
| 7,099,947 B1 | 8/2006 | Nadeau | |
| 7,225,244 B2 * | 5/2007 | Reynolds et al. ............ 709/223 |
| 7,260,621 B1 | 8/2007 | Lavian et al. | |
| 7,293,052 B1 | 11/2007 | Kavasseri | |
| 7,313,631 B1 * | 12/2007 | Sesmun et al. ............. 709/245 |
| 7,356,601 B1 | 4/2008 | Clymer et al. | |
| 7,594,170 B2 * | 9/2009 | Snover et al. .............. 715/243 |
| 7,698,359 B2 * | 4/2010 | Wray et al. ................. 709/200 |
| 2002/0124064 A1 | 9/2002 | Epstein et al. | |
| 2002/0184409 A1 * | 12/2002 | Broussard .................. 709/328 |
| 2003/0126195 A1 | 7/2003 | Reynolds et al. | |
| 2004/0003112 A1 | 1/2004 | Alles et al. | |
| 2004/0041833 A1 * | 3/2004 | Dikhit ....................... 345/738 |
| 2005/0088449 A1 * | 4/2005 | Blanco et al. .............. 345/547 |
| 2005/0097440 A1 | 5/2005 | Lusk et al. | |
| 2005/0195660 A1 | 9/2005 | Kavuri et al. | |

OTHER PUBLICATIONS

USPTO, PCT International Search Report and Written Opinion: PCT/US2006/047817; Apr. 24, 2008.

(Continued)

*Primary Examiner*—William L Bashore
*Assistant Examiner*—David Phantana-angkool
(74) *Attorney, Agent, or Firm*—Stolowitz Ford Cowger LLP (57) ABSTRACT

A method of provisioning a device through a command interface is described. A command interface capable of displaying a plurality of outputs is generated. A request is sent to a device and feedback from the device is received. The feedback is used to generate an output. Graphical display for the output is generated for display integral with the command interface.

25 Claims, 4 Drawing Sheets

OTHER PUBLICATIONS

Extending Network Security with Cisco IOS Software Release 12.3(7)T Cisco Systems, Mar. 2004, p. 12.

Cisco IOS Configuration Fundamentals and Netrork Management Command Reference, Relaease 12.3 T, Cisco Systems, p. CFR-511.

Special Edition Using Microsoft Access 2000 by Riger Jennings. Publisher: Que. Pub. Date May 5, 1999.

Wijnen B., McCloghrie K.; RFC 3415-View-based Access Control Model (VACM) for the Simple Network Management Protocol (SNMP); Dec. 2002; http//www.faqs.org/rfcs/rfc3411.html.

Harrington, D, Preshun R., Wijnen B.; RFC 3411—An Architechture for Describing Simple Network Management Protocol (SNMP) Management Frameworks; Dec. 2002; http://www.faqs.org/rfcs/rfc3411.html.

Harrington, D, Preshun R., Wijnen B.; RFC 2571—An Architechture for Describing (SNMP) Management Frameworks; Apr. 1999; http://www.faqs.org/rfcs/rfc2571.html.

Wijnen B., McCloghrie K.; RFC 2575-View-based Access Control Model (VACM) for the Simple Network Management Protocol (SNMP); Apr. 1999; http//www.faqs.org/rfcs/rfc2575.html.

* cited by examiner

COMMAND INTERFACE

FIELD OF THE INVENTION

The present invention relates to a method of provisioning a device through a command interface.

BACKGROUND

Command line interface has traditionally been one of the preferred interfaces of network operators. Many network operators prefer to work with command line interfaces due to the raw commands they are able to issue and due to the feel of direct access to network devices command line interface is able to provide to the network operators. As of result, device manufacturers generally try to make sure that their devices provide a form of command line interface.

However, despite its popularity with network operators, command line interface has a drawback in terms of its ability to display graphical objects. For example, when a response/output from a device is in the form of a table, a graph, a map, or a topology, it is often difficult for a network operator to view and interpret the response/output due to the limitations of displaying graphical objects in a command line interface.

In response, some conventional management applications provide a graphical user interface in place of the command line interface for allowing the network operator to access a network device. Nevertheless, these conventional graphical user interfaces often do not give the network operator a feeling of working with the network device directly as opposed to when they work with command line interfaces. To exacerbate the problem, frequently traditional graphical user interfaces are slow, more complex to use, and involve more trouble shooting as compared to command line interfaces.

DETAILED DESCRIPTION

Command interfaces capable of displaying a plurality of outputs are described. Reference will now be made in detail to embodiments, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display.

In overview, embodiments pertain to methods and systems of provisioning a device through a command line interface of a command interface capable of generating a graphical display for displaying outputs within the command interface. In general, provisioning a device through a command interface means that the user of the command interface has access and privileges to the data and technology resources of the device. A command interface refers to an interface which is capable of displaying outputs in a plurality of formats such as command line interface format and graphical display format (also referred to as graphical format) in the same window.

In some instances, embodiments include user-configurable specification for the formats (also referred to as user-defined formats, or user-defined specifications) of the outputs desired. For example, in one embodiment, desired outputs conform to pre-defined user specifications, which result in the outputs being displayed in various formats (also referred to as forms) such as command line interface (CLI) format and graphical display formats (e.g., a graph, a table, and a network topology).

In addition, in one embodiment, not only does a command interface allow users to mix and match capabilities of the command line interface and graphical display in the same window/screen, but the command interface allows provisioning of devices through a web-browser. In other words, a command interface may provide a user with access and privileges to data and technology resources of a device by establishing a secure session with the device via a web-browser. A command interface with such capability may also be referred to hereinafter as a command web interface, or a web based command interface.

Figure 1:
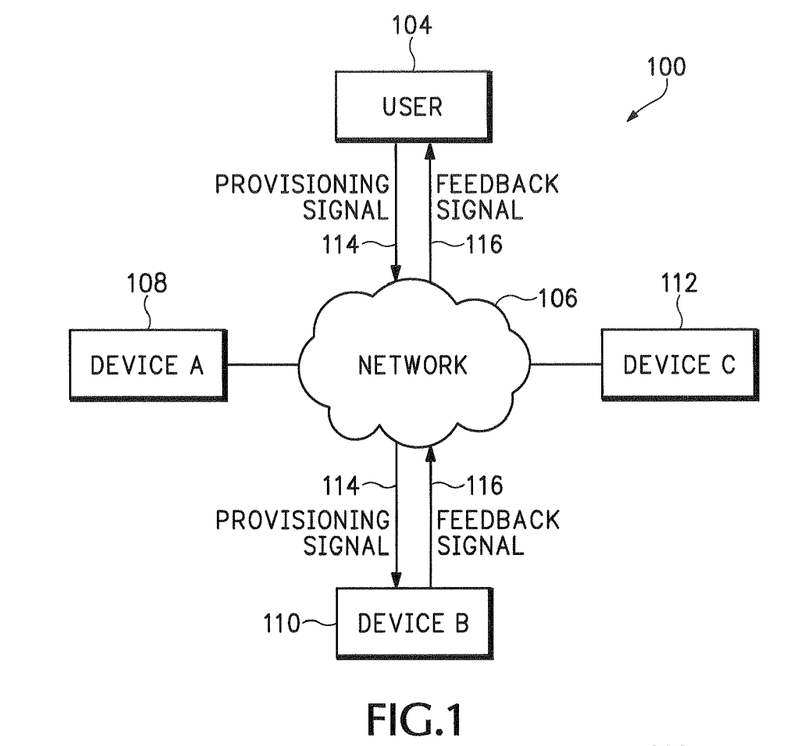
FIG. 1 illustrates a block diagram of an exemplary system used in accordance with an embodiment of the present invention.

FIG. 1 is a block diagram of an exemplary system 100 upon which embodiments may be implemented. The exemplary system 100 shows the components of an exemplary command interface display in accordance with the present embodiment. As depicted in FIG. 1, the command interface display 100 includes a user 104, a plurality of devices A, B, and C (e.g., 108, 110, and 112 respectively), all coupled to one another via the network 106. Although system 100 is shown and described as having certain numbers and types of elements, the present embodiment is not so limited; that is, system 100 may include elements other than those shown, and may include more than one of the elements that are shown.

As depicted by system 100 of FIG. 1, network 106 is a data communications system that interconnects devices. The network 106 can be implemented in a wide variety of ways. For example, network 104 can be implemented as, but is not limited to, a local area network (LAN), a metropolitan area network (MAN), a wide area network (WAN), a storage area network, and/or the Internet. In one embodiment, network 106 is a wireless network.

The user 104 of the system 100, depicted by FIG. 1, can be an individual user device, a network manager, an application program, and enterprise, or a service provider. The user 104 issues a request for a plurality of outputs in a plurality of user-defined display formats (also referred to as forms) associated with a device. The user 104 can also designate the device, or devices, to be provisioned using a command line interface format of the command interface. Additionally, the user 104 can customize the display format of the outputs requested.

In reference to FIG. 1, the present embodiment is described in the context of an example in which there are three devices A, B, and C (e.g., 108, 110, and 112 respectively) connected to network 106, but in another example, there could be there a different number of device(s) connected to the network 106. Furthermore, the present embodiment is described in the context of an example in which the user 104 provisions device B (e.g., 110) using the command line format of a command web interface via a web-browser and the network 106, but in another embodiment, another device other than device 110 is provisioned, and a command web interface provisions device B directly using a web-browser.

Referring now to FIG. 1, in operation, the user 104 sends to the device 110 a provisioning signal 114 using the command line format of a command web interface via the network 106. The device 110 then sends back to the user 104 a feedback signal 116 via the network 106. The feedback signal 116 is then used to generate a graphical display of an output to be displayed within said command web interface.

Figure 2:
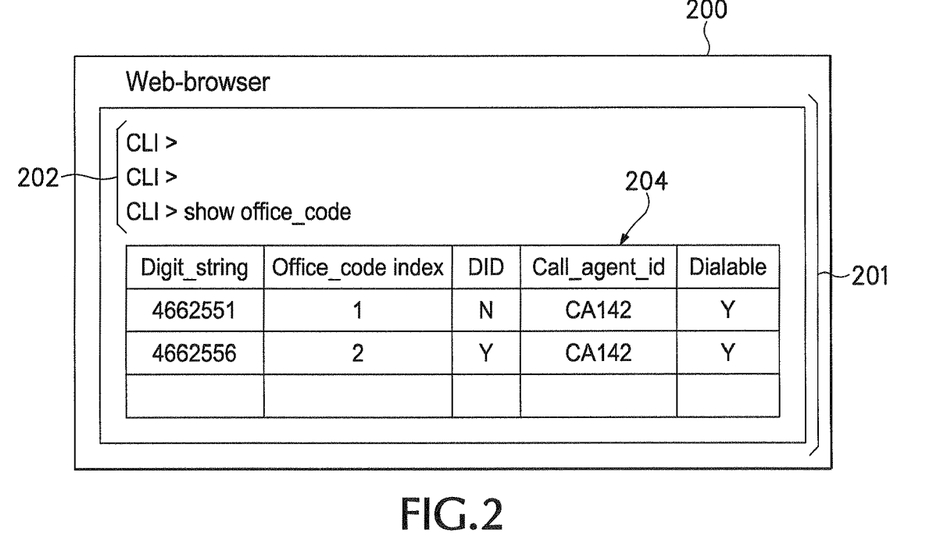
FIG. 2 illustrates a block diagram of an exemplary command interface used in accordance with an embodiment of the present invention.

FIG. 2 is a block diagram of an exemplary command interface 201 as part of a web-browser 200 upon which embodiments may be implemented. In present embodiment, the exemplary command interface is referred to as command web interface 201. In the present embodiment, command web interface 201 is described in the context of a command interface which has provisioned a device or established a secure session with a device for provisioning by using web-browser 200. However, this example can be readily extended to other situations and embodiments. For example, in another embodiment, a command interface does not establish a secure session with a device for provisioning by using a web-browser.

As depicted in FIG. 2, the exemplary command web interface 201 includes command line interface 202 and a graphical display 204, which is depicted as a table in the present embodiment. Graphical display 204 may depict other forms of graphical output. For example, in another embodiment, command web interface 201 does not include a table, but includes a command line interface, a graph, and a network topology. As depicted in FIG. 2, the command web interface 201 is an interface which allows provisioning of devices through a web-browser and allows one or more user(s) to mix and match capabilities of the command line interface (e.g., 202) and graphical displays (e.g., 204) in the same window/screen and/or in the same interface. Although exemplary command web interface 201 is shown and described as having certain numbers and types of elements, the present embodiment is not so limited; that is exemplary command web interface 201 may include elements other than those shown. In addition, in another embodiment, exemplary command web interface 201 does not include all of the numbers and types of elements shown in FIG. 2.

Figure 3:
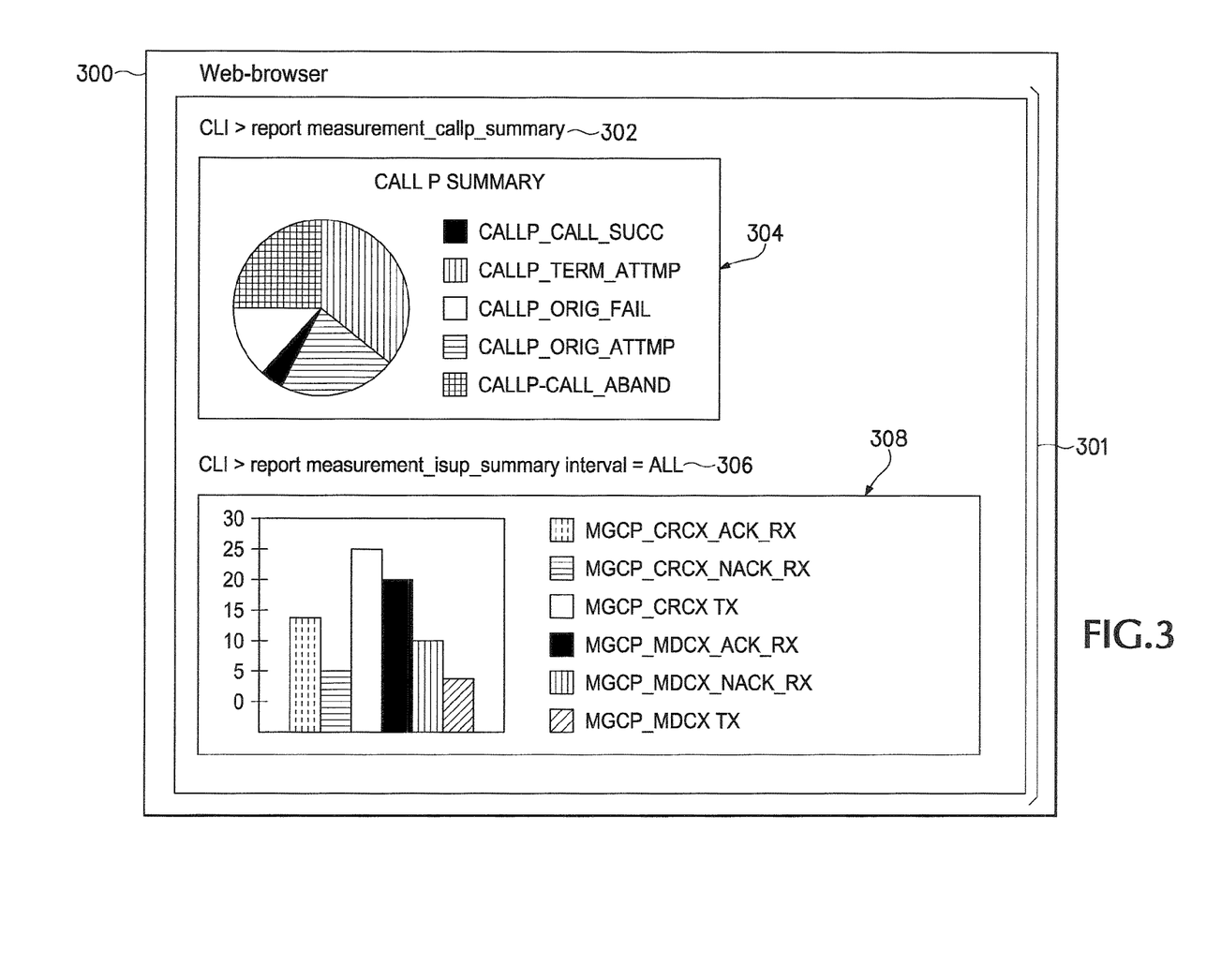
FIG. 3 illustrates a block diagram of an exemplary command interface used in accordance with an embodiment of the present invention.

FIG. 3 is a block diagram of an exemplary command interface 301 as part of a web-browser 300 upon which embodiments may be implemented. In present embodiment, the exemplary command interface is referred to as Command Web Interface 301. In the present embodiment, command web interface 301 is described in the context of a command interface which has provisioned a device or established a secure session with a device for provisioning by using web-browser 300. The present embodiment is further described in the context of an example in which the user has customized the display format of requested outputs to a user-configurable specification (also referred to as a user-defined specification). In the example depicted by FIG. 3, the user-configurable specification corresponded to a pie graph and a bar graph. However, this example can be readily extended to other situations and embodiments. For example, in another embodiment, a command interface may request for output in a display format corresponding to another user-defined specification, which returns the output as a line graph and a network topology.

As depicted in FIG. 3, the exemplary command web interface 301 is part of web-browser 300 and includes command line interface 302, command line interface 306, graphical display 304, and graphical display 308. In the present embodiment, the user-defined specification for the form of output requested by command line interface 302 is a pie graph, while the user-defined specification specifies a bar graph for the output requested by command line interface 306. Thus, graphical display 304 of command web interface 301 depicts a pie graph and graphical display 308 depicts a bar graph. In another embodiment, graphical displays 304 and 306 depict other forms of graphical output, such as a network topology and a line graph.

Still referring to FIG. 3, command web interface is an interface capable of receiving input in a command line interface format and presenting output both in a command line interface format and a graphical display format within the same window and/or screen. Although exemplary command web interface 301 is shown and described as having certain numbers and types of elements, the present embodiment is not so limited; that is exemplary command web interface 301 may include elements other than those shown. In addition, in another embodiment, exemplary command web interface 301 does not include all of the numbers and types of elements shown in FIG. 3.

Figure 4:
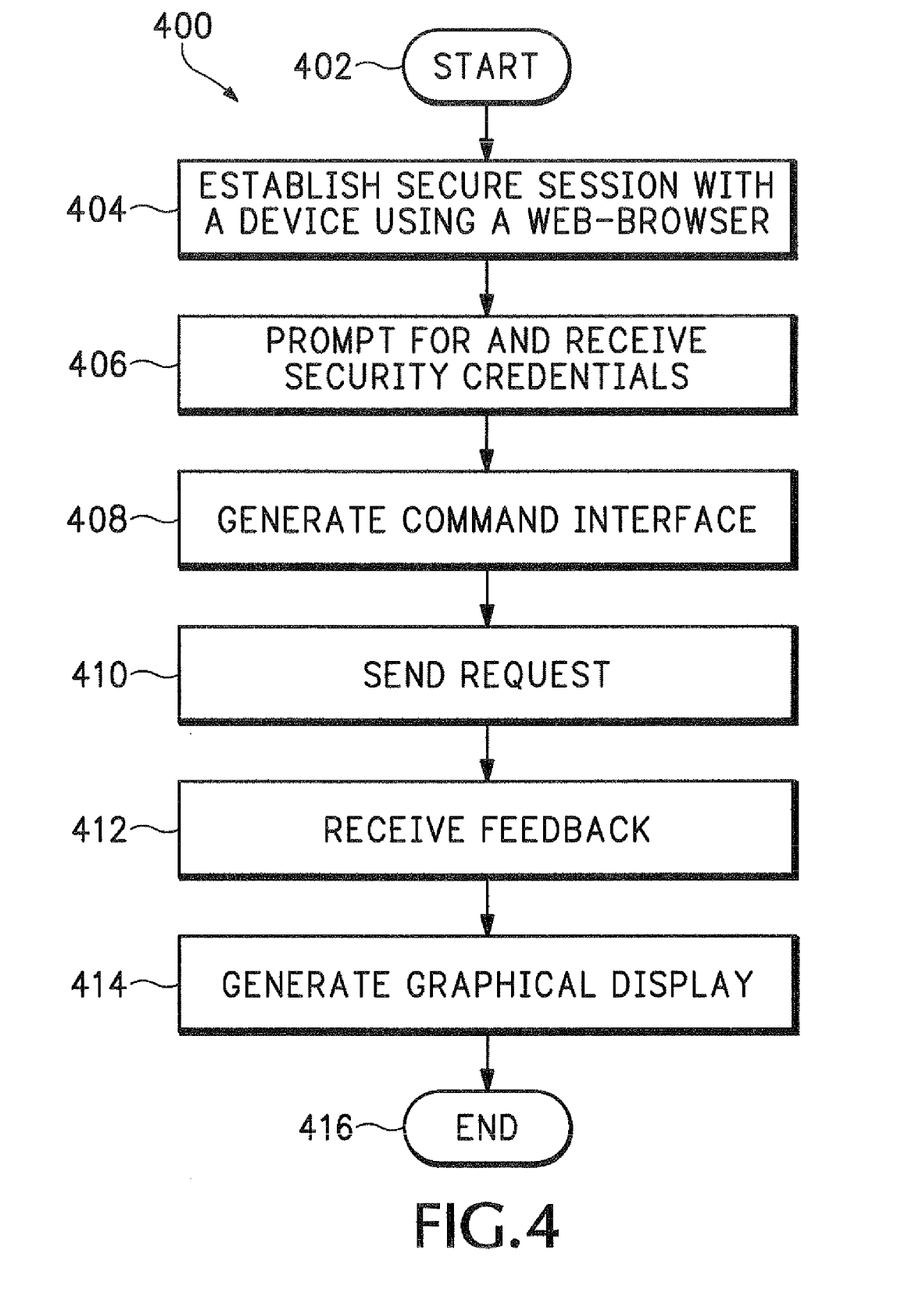
FIG. 4 illustrates a flowchart showing an exemplary method of provisioning a device through a command interface, according to an embodiment.

FIG. 4 illustrates a flowchart showing a method 400 of provisioning a device through a command interface, according to an embodiment. In one embodiment, method 400 is implemented by a processing device, such as a computer. Although specific steps are disclosed in flowchart 400, such steps are exemplary. That is, various embodiments are well suited to performing a variety of other additional steps or variations of the steps recited in flowchart 400. The steps in flowchart 400 may also be performed in an order different than presented. At block 402 of FIG. 4, the process starts.

At block 404 of FIG. 4, in the present embodiment, in order to provision a device, a web-browser is used by a user to establish a secure session with a device via a network. A network may be implemented in a wide variety of ways. For example, a network may be implemented as, but is not limited to, a local area network (LAN), a metropolitan area network (MAN), a wide area network (WAN), a storage area network, and/or the Internet.

Still referring to block 404 of FIG. 4, a user can be an individual user, an individual user device, an enterprise, a service provider, or an application program. Also, there can be multiple numbers and/or types of users simultaneously. In one embodiment, a secure session is established with a device which supports a telnet interface. For example, in one embodiment, a command web interface may intercept a request and channel it to the corresponding telnet port of a device. In another embodiment, a command interface is used to provision a device that provides a command line interface. In yet another embodiment, the method 400 does not include using a web-browser to provision a device.

At block 406 of FIG. 4, in the present embodiment, a computer is used for prompting and receiving security credentials of a user. For example, in one embodiment, a command web interface may allow a user to provision a device after it receives the user credentials from the user and authenticates the user. In another embodiment, user security credentials may not be prompted for and/or received before a secure session is established with the device.

At block 408 of FIG. 4, in the present embodiment, a command line interface capable of displaying a plurality of outputs is generated. Raw device commands may be issued through the command line interface to a selected device for execution.

At block 410 of FIG. 4, in the present embodiment, a raw device command (also referred to as a request) is sent to a selected device. A raw device command/request may be a request for an output, or a plurality of outputs. Whether the raw device command/request is sent via a network depends on whether the device was provisioned through a web-browser. If the device was provisioned through a web-browser, then the request is sent via a network. In the present embodiment, the raw device command/request is sent via a network. In another embodiment, the raw device command/request is not sent via a network.

At block 412 of FIG. 4, in the present embodiment, feedback from the selected device for the requested output is received by the command web interface. In the present embodiment, the feedback is used to generate the requested output. The feedback from the device may conform to a user-defined format (also referred to a user-defined specification). For example, in one embodiment, a user-defined format may be a bar graph for one output and a network topology for another output. In another embodiment, the feedback from the device does not conform to a user-defined format.

At block 414 of FIG. 4, in the present embodiment, a graphical display for the output requested is generated. As stated above, the graphical display of output requested may be customizable. For example, due to one user-defined specification, in one embodiment, the graphical display for the output requested output is in the form of a table graph. In another embodiment, the graphical display for the requested is in the form of a line graph. At block 416, the process ends.

Figure 5:
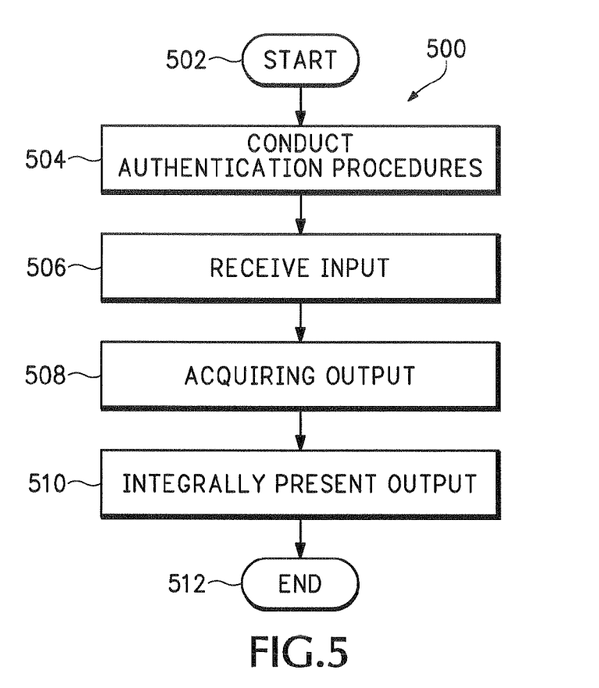
FIG. 5 illustrates a flowchart showing an exemplary method of displaying an output in a web based command interface according to an embodiment.

FIG. 5 illustrates a flowchart showing a method 500 of displaying an output in a web based command interface, according to an embodiment. In one embodiment, method 500 is implemented by a processing device, such as a computer. Although specific steps are disclosed in flowchart 500, such steps are exemplary. That is, various embodiments are well suited to performing a variety of other additional steps or variations of the steps recited in flowchart 500. The steps in flowchart 500 may also be performed in an order different than presented. At block 502 of FIG. 5, the process starts.

At block 504 of FIG. 5, in the present embodiment, in order to display an output in a web based command interface, in the present embodiment, a computer is used for conducting authentication procedures. Authentication procedures may include prompting and receiving security credentials of a user. In another embodiment, user authentication procedures may not be required before a secure session may be established with a desired device.

At block 506 of FIG. 5, in the present embodiment, a raw device command (also referred to as input) is received by a web based command interface. An input may be a request through a command line interface for an output, or a plurality of outputs from a selected device. In one embodiment, a plurality of inputs requesting a plurality of outputs from a selected device, or a plurality of selected devices, may be received.

At block 508 of FIG. 5, in the present embodiment, output (s) displayable in a command line interface format and a graphical display format is/are acquired by the web based command interface from the selected device(s). In one embodiment, the output(s) correspond(s) to the input(s) by the user. In another embodiment, the output(s) from the device may conform to a user-defined format. For example, in one embodiment, a user-defined format (also referred to as user-configurable specification) may be a bar graph for one output and a network topology for another output.

At block 510 of FIG. 5, in the present embodiment, the output(s) acquired by the web based command interface are integrally presented in a window of the web based command interface, in at least one display format matching a user-configurable specification. For example, in one embodiment, two sets of outputs were requested for and displayed within a window of the web based command interface, with the first set of outputs displayed in a graphical display format of a pie graph and the second set of outputs displayed in a graphic display format of a line graph. In another embodiment, three outputs are displayed in a window of the web based command interface in two graphical display formats and a command line format. At block 512 of FIG. 5, the process ends.

Thus by having a method of provisioning a device through a command interface, a user may provision the device, input raw commands using a command line interface of the command interface, and receive the selected set of results (outputs) as graphical displays. In addition, a command interface may also allow for user-configurable specification for the formats of the results/outputs desired. Furthermore, a command interface may also provide a user with the ability to provision a device by establishing a secure session with the device via a web-browser. In summary, by having a method of provisioning a device through a command interface, not only is the user able to mix and match capabilities of the command line interface and graphical display in the same window/screen, but the user able to provision the device through a web-browser.

Figure 6:
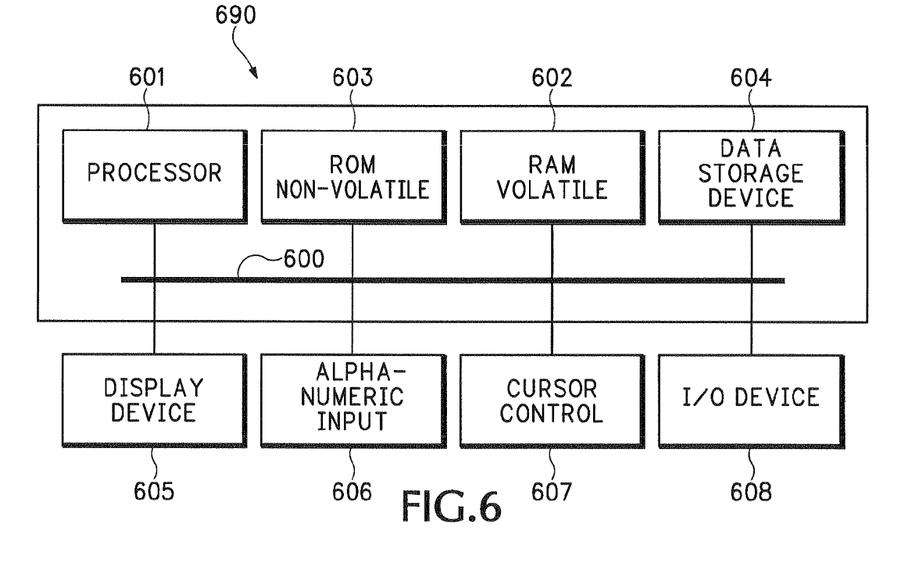
FIG. 6 illustrates an exemplary computer system in which provisioning of a device through a command interface may be practiced, according to an embodiment.

FIG. 6 illustrates an exemplary computer system 690 upon which a method of provisioning a device through a command interface may be practiced. In general, computer system 690 comprises bus 600 for communicating information (e.g., data associated with requested output(s)), processor 601 coupled with bus 600 for processing information and instructions, random access (volatile) memory (RAM) 602 coupled with bus 600 for storing information and instructions for processor 601, read-only (non-volatile) memory (ROM) 603 coupled with bus 600 for storing static information and instructions for processor 601, data storage device 604 such as a magnetic or optical disk and disk drive coupled with bus 600 providing a computer-usable medium having computer-readable program code embodied thereon for storing information and instructions for implementing the above-described display methods, an optional user output device such as display device 605 coupled to bus 600 for displaying information, including a requested output in a graphical format in the command interface. In addition, computer system 690 also comprises an optional user input device such as alphanumeric input device 606 including alphanumeric and function keys coupled to bus 600 for communicating information and command selections (e.g., selection of designated device(s)) to processor 601, and an optional user input device such as cursor control device 607 coupled to bus 600 for communicating user input information and command selections to processor 601. Furthermore, an optional input/output (I/O) device 608 is used to couple computer system 690 onto, for example, a network.

Display device 605, which may be used for displaying a command interface, is utilized with computer system 690. Display device 605 may be a liquid crystal device, cathode ray tube, or other display device suitable for creating graphic images and alphanumeric characters recognizable to the user. Cursor control device 607 allows the computer user to dynamically signal the two-dimensional movement of a visible symbol (pointer) on a display screen of display device 605. Many implementations of the cursor control device are known in the art including a trackball, mouse, joystick or special keys on alphanumeric input device 606 capable of signaling movement of a given direction or manner of displacement. It is to be appreciated that the cursor control 607 also may be directed and/or activated via input from the keyboard using special keys and key sequence commands. Alternatively, the cursor may be directed and/or activated via input from a number of specially adapted cursor directing devices.

In the foregoing specification, embodiments have been described with reference to numerous specific details that may vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of provisioning a device through a command interface, the method comprising:

generating a command interface display comprising a command line interface format, wherein the display is configured to graphically represent a plurality of configurable outputs in both a graphical user interface (GUI) format and a command line interface format;

sending a request to the device, wherein the request comprises a raw command text form;

receiving a feedback signal from the device, wherein the feedback signal corresponds to the request, and wherein the feedback signal is used to generate a user defined output from the plurality of outputs corresponding to the feedback signal; and concurrently displaying in the command interface display the user defined output in a combined command line interface and GUI display format, wherein a command line interface text is associated with the raw text command sent to the device for provisioning the device and wherein the GUI is associated with the raw text command in the display wherein the output corresponding to the feedback signal is displayed in a graphical object format with the command interface.

2. The method of claim 1 further comprising using a web-browser for establishing a secure session with the device prior to sending the request.

3. The method of claim 2 wherein establishing a secure session further comprises exchanging authentication credentials.

4. The method of claim 1 further comprising prompting for and receiving security credentials from a user.

5. The method of claim 1 further comprising provisioning the device wherein the device supports a telnet interface.

6. The method of claim 1 wherein the format of the output displayed within the command interface display is customizable to one or more different display formats.

7. The method of claim 1 wherein the graphical display for the output comprises a table, graph or network topology, or combinations thereof.

8. The method of claim 1 wherein the output in the combined command line interface and graphical object format is displayed in a same window.

9. A method of displaying an output in a web based command interface, the method comprising:

sending a request comprising a raw device command to a remote network device for provisioning the remote device using corresponding command line operations in a web-based command interface in command line interface format;

receiving an input from the remote network device responsive to the raw device command, wherein the input corresponds to the request;

generating an output corresponding with the input comprising a graphical object; and concurrently displaying, in a single display screen the output in a graphical display format in the web-based command interface wherein the graphical object is positioned inline with a command line of the command line interface format, wherein the command line is associated with the raw device command, and wherein the graphical display format is configurable to one or more display formats comprising: a table format, a graph format, and a network topology format.

10. The method of claim 9 further comprising conducting authentication procedures for provisioning the device.

11. A graphical user interface embodied in a tangible machine readable medium for display on a screen, the graphical user interface configured for provisioning devices comprising:

a simulated command line interface configured to accept a command line operation input by a user for provisioning a remote network device;

a web based display configured to display integrated text and one or more graphical objects corresponding to the command line operations, wherein the one or more graphical objects represent a response of the remote network device to execution of the command line operation sent in raw command text, the raw command text corresponding to the command line operation wherein the web based display comprises a command line interface format in side-by-side display with the one or more graphical objects, wherein the one or more graphical objects are each associated with a feedback message received from the remote network device responsive to the execution of the command line operation in the remote network device, and wherein, in the web based display, the one or more graphical objects are displayed inline with the command line operation executed at the remote device responsive to the feedback message.

12. The graphical user interface of claim 11 wherein the web based display comprises a browser.

13. The graphical user interface of claim 11 further comprising a prompt for receiving security credentials from a user.

14. The graphical user interface of claim 11 further comprising an interface for conducting authentication procedures for provisioning the device.

15. The graphical user interface of claim 11 further comprising a telnet interface.

16. The graphical user interface of claim 11 wherein a display format of the graphical objects is customizable.

17. The graphical user interface of claim 11 wherein a user-defined format comprises a format selected from the group consisting of: table format, graph format, and network topology format.

18. A computer-usable medium having computer-readable program code embodied therein for implementing a method of displaying a command interface output, the method comprising:

generating a command interface display comprising a plurality of command lines in a command line interface format, wherein the command interface display is configured to graphically represent a plurality of configurable outputs in both a graphical user interface(GUI) format and a command line interface format;

sending a request to a device for provisioning the device, wherein the request comprises raw command text associated with a command line of the plurality of command lines;

receiving a feedback signal from the device, wherein the feedback signal corresponds to the request, and wherein the feedback signal is used to generate a user defined output from the plurality of outputs, the user defined output comprising a GUI corresponding to the feedback signal;

concurrently displaying in the command interface display the user defined output in a combined command line interface and GUI display, wherein the GUI is displayed inline with the command line.

19. The computer-usable medium of claim 18 further comprising using a web-browser for establishing a secure session with the device.

20. The computer-usable medium of claim 18 further comprising prompting for and receiving security credentials from a user.

21. The computer-usable medium of claim 18 further comprising conducting authentication procedures for provisioning the device.

22. The computer-usable medium of claim 18 wherein a user-defined specification establishes one or more display formats for the output wherein the display format comprises a format selected from the group consisting of: table format, graph format, and network topology format.

23. A computer for displaying an output in a web based command interface comprising:

an input for accepting command line operations;

a processor coupled to the input, wherein the processor is configured to prepare a request for provisioning a remote device coupled to the computer;

a transmitter for sending the request to the remote device, wherein the request comprises a raw text command;

a receiver for receiving a feedback signal from the remote device, wherein the feedback signal corresponds to the request, and wherein the feedback signal is used to generate a user defined output from a plurality of outputs corresponding to the feedback signal;

a display coupled to the processor for:

generating a command interface display comprising a command line interface format;

graphically representing the user defined output as a graphical object; and concurrently displaying, in the command interface display, the graphical object associated with the user defined output positioned inline with a command line corresponding to the raw text command in the command line interface format.

24. The computer of claim 23 further comprising conducting authentication procedures for provisioning the device.

25. The computer of claim 23 wherein the graphical object comprises a format selected from the group consisting of: table format, graph format, and network topology format.

* * * * *